Jan. 12, 1937.   J. W. B. PEARCE   2,067,285
FLEXIBLE JOINT FOR POWER SHAFTS
Filed Nov. 15, 1934   2 Sheets-Sheet 1
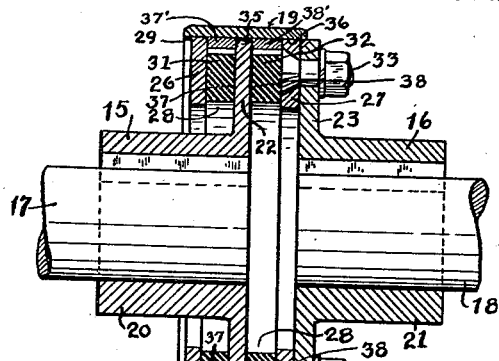
FIG. 2.
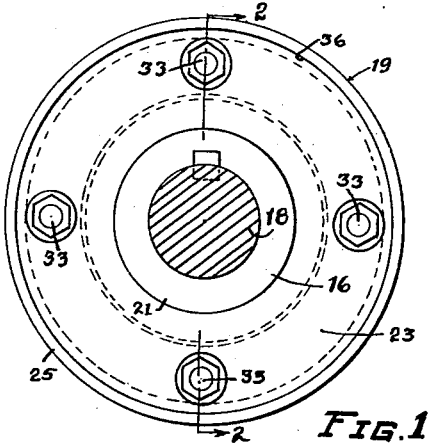
FIG. 1.
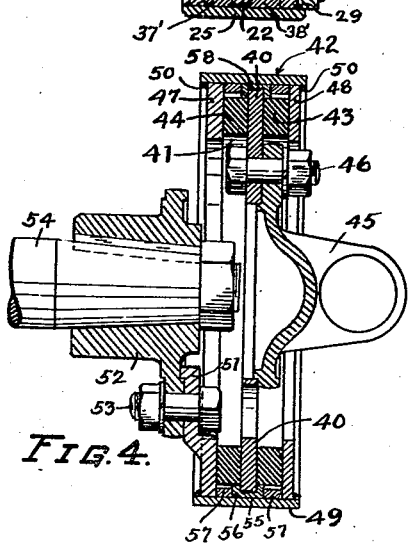
FIG. 4.
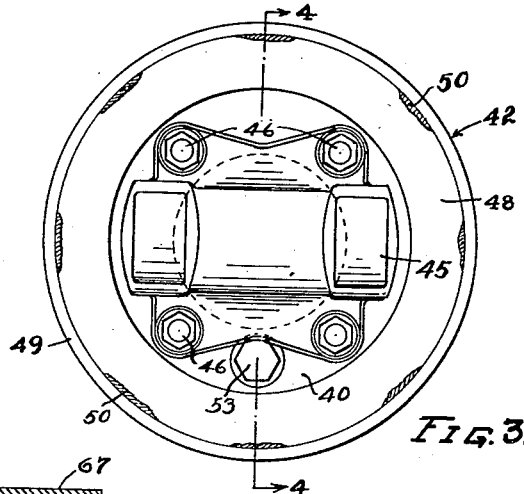
FIG. 3.
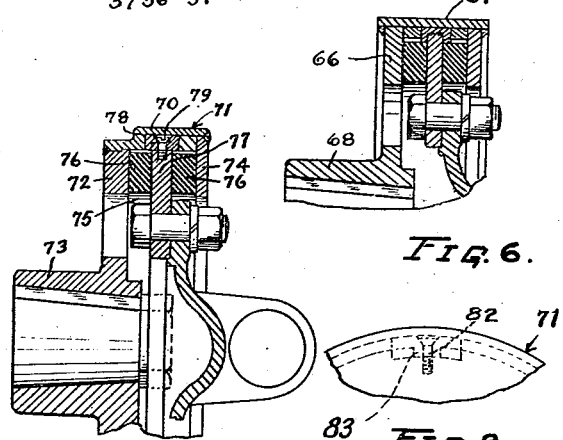
FIG. 7.   FIG. 6.   FIG. 8.   FIG. 5.
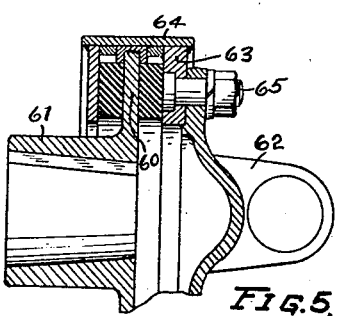
INVENTOR.
JOHN W. B. PEARCE.
BY
Kwis Hudson+Kent
ATTORNEYS Jan. 12, 1937.   J. W. B. PEARCE   2,067,285
FLEXIBLE JOINT FOR POWER SHAFTS
Filed Nov. 15, 1934   2 Sheets-Sheet 2
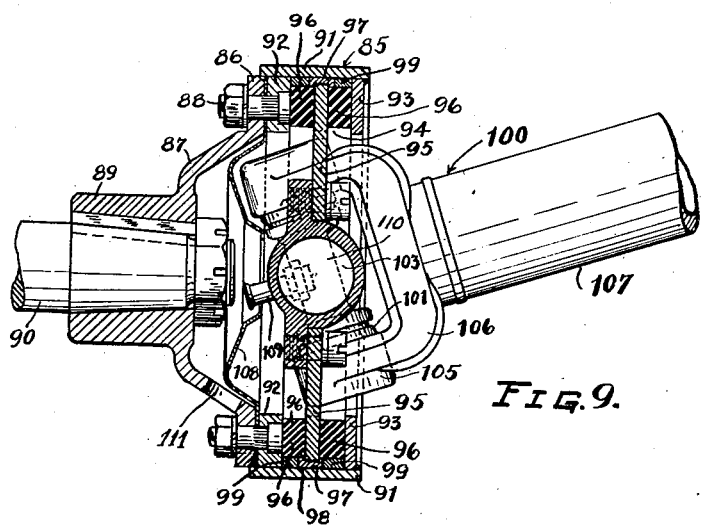
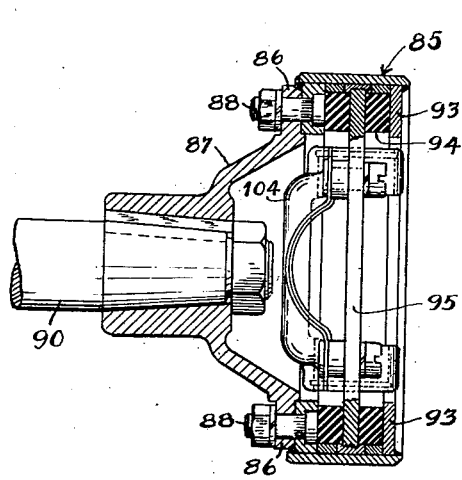
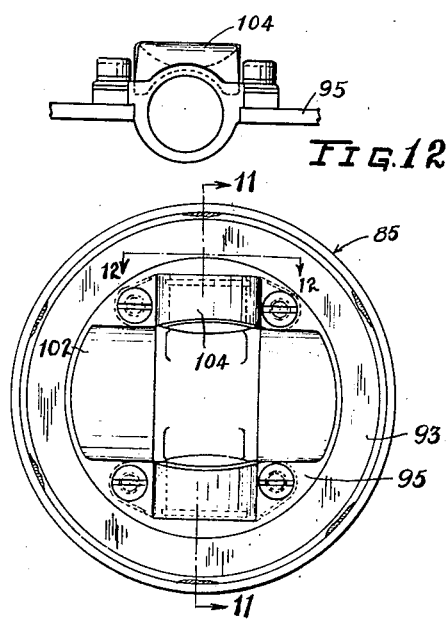
INVENTOR.
JOHN W. B. PEARCE.
BY Kwis Hudson & Kent.
ATTORNEYS Patented Jan. 12, 1937

2,067,285

UNITED STATES PATENT OFFICE 2,067,285

FLEXIBLE JOINT FOR POWER SHAFTS

John W. B. Pearce, Toledo, Ohio

Application November 15, 1934, Serial No. 753,171

9 Claims. (Cl. 64—27)

This invention relates to flexible joints, and more particularly to flexible joints for power shafts constituting an improvement over the flexible joints disclosed in co-pending application, Serial No. 753,170, filed November 15, 1934.

The principal object of the present invention is to provide a flexible joint, for power shafts or the like, having rubber arranged therein so that the power is transmitted from one joint member to the other through the rubber, and wherein means is provided for confining to a given path the relative rotary movement which is permitted between the joint members by the rubber and for diametrically confining the joint members to limit lateral misalignment of the shafts.

Another object of this invention is to provide a flexible joint, for torque transmitting shafts, having rubber arranged to connect the joint members so as to permit limited relative movement therebetween for cushioning and absorbing shocks and vibrations in the torque, and wherein cooperating bearing parts associated with the joint members confine the relative movement thereof to a given path.

A further object of this invention is to provide a flexible joint, of the type referred to, having cooperating joint members one of which is a ring part provided with an annular recess and a bearing groove and the other of which has a disk or flange part extending into said recess, and wherein rubber arranged in said recess connects the flange and ring parts and bearing means on the flange part is operable in said groove for confining to a given path the relative rotary movement permitted between the flange and ring parts by the rubber.

It is also an object of this invention to provide a flexible joint, of the type referred to, wherein one of the joint members is a universal joint structure which is connected to the flange part, such that the universal joint center is always located in the central plane of the flexible joint.

Yet another object of this invention is to provide a flexible joint having a universal joint structure embodied therein with its center always lying in the central plane of the joint, and wherein rubber which transmits power from one joint member to the other is arranged outwardly of the universal joint structure and confining bearing means for the joint members is arranged outwardly of the rubber.

Other objects and advantages of the invention will be apparent from the following description, when taken in conjunction with the accompanying sheets of drawings, wherein Fig. 1 is an end view of a flexible joint constructed according to my invention.

Fig. 2 is a longitudinal sectional view thereof taken on line 2—2 of Fig. 1.

Fig. 3 is an end view of another flexible joint embodying my invention.

Fig. 4 is a sectional view thereof taken on line 4—4 of Fig. 3.

Figs. 5, 6 and 7 are partial sectional views taken similar to Fig. 4, but illustrating other constructions for my improved flexible joint.

Fig. 8 is a partial end view of the joint of Fig. 7 and illustrating a detail of construction.

Fig. 9 is a longitudinal sectional view taken through another flexible joint embodying my invention.

Fig. 10 is an end view thereof, but with one of the yokes and the cross of the universal joint omitted.

Fig. 11 is a sectional view taken on line 11—11 of Fig. 10, and

Fig. 12 is a partial elevational view taken in the direction indicated by line 12—12 of Fig. 10.

In the accompanying drawings to which detailed reference will now be made, I have shown several forms of my improved flexible joint for power shafts. It will be understood, of course, that the joints shown in the drawings are by way of illustration, and that the invention may be embodied in various other forms of joints and couplings.

In general, the present invention provides for a flexible joint having rubber arranged therein so that the force being transmitted by the joint is transmitted from one joint member to the other through the rubber and vibrations and shocks in the flow of power are cushioned and absorbed by a flexing of the rubber. This improved flexible joint also embodies means for diametrically confining the joint members to prevent lateral misalignment of the shafts, and means for confining to a given path the limited relative rotary movement which is permitted between the joint members by the flexing of the rubber so as to avoid a wobbling or gyratory movement of the joint.

In Figs. 1 and 2 of the drawings I have shown these and other novel features embodied in a flexible joint of relatively simple construction, and which may be used for the transmission of torque for any desired purpose. As shown in Fig. 2, this joint includes joint members 15 and 16 which are connected, respectively, to the adjacent ends of substantially aligned shafts 17 and 18, and an intermediate ring member 19 which cooperates with the joint members in such a way as to provide the desired flexible torque transmitting connection therebetween.

The joint members 15 and 16 may be of different forms of construction, and in this instance these members are in the form of companion flanges having hub portions 20 and 21 keyed to the shaft ends and substantially radially extending flange parts 22 and 23 which cooperate with the ring member in a manner presently to be explained.

The intermediate ring member 19 may be of different forms of construction, depending upon the character of service which the joint is to render and upon the details of construction of the particular joint members with which this part is used. In this instance the intermediate ring member is constructed with a tubular outer metal shell or casing 25 and with a pair of flanges 26 and 27 extending radially inwardly from the shell at spaced points so as to provide therebetween an annular recess 28, into which the flange part 22 of the joint member 15 extends. The tubular shell 25 of the ring member may be shrunk onto the end flanges 26 and 27, and, if desired, a further connection may be provided between these parts in the form of spaced welds 29.

To establish the desired flexible connection between the joint members, I provide rubber in the recess 28 of the ring member 19 arranged so that the power transmitted from one joint member to the other will be transmitted through the rubber, and so that shocks or vibrations in the power flow will be cushioned and absorbed by a flexing of the rubber. This rubber may be arranged in various ways, but preferably is in the form of rings or segments 31 and 32 which are disposed in the recess 28 on opposite sides of the flange part 22. The rubber rings are connected to the flanges 26 and 27 of the ring member and to the flange part 22, and the rubber provides the only power transmitting connection between the flange part and the ring member.

The connection between the rubber and the surfaces of the metal flanges may be established in various ways, for example, by bonding the rubber with the metal such as by curing the rubber in contact with the metal surfaces. This connection may also be established as a frictional connection formed by compressing the rubber against the metal surfaces. This connection may also be one in which the rubber is bonded to the metal and also maintained under compression. When a connection according to either of the latter two forms is utilized the rubber rings 31 and 32 are compressed against the flange part 22 by the end flanges 26 and 27 of the ring member.

The ring member 19 is carried by the joint member 16 and may be connected to the flange 23 of this member by a series of bolts 33. It will be understood, of course, that these bolts are extended through the flange 27 of the ring member before the rubber rings are arranged in the recess 28.

It will be seen from the arrangement thus far described that the rubber in the annular recess 28 provides the only power transmitting connection between the joint members 15 and 16, and that when torque is transmitted through the shafts a flexing of the rubber will allow a limited relative movement to take place between the flange part 22 and the ring member 19. This flexing of the rubber cushions and absorbs shocks and vibrations in the torque, so that a smooth and even flow of power may be transmitted through the shafts.

As an important feature of my invention, I provide means for diametrically confining the joint members to prevent lateral misalignment of the shafts; and also means for confining, to a given path, the limited relative rotary movement which is permitted between the joint members by the rubber, to thereby prevent a gyratory or wobbling movement of the joint as the shafts are rotated. In the flexible joint of Figs. 1 and 2, I show this limiting or confining means as comprising cooperating bearing parts associated with the respective joint members.

The first of these confining bearings is formed by the peripheral surface or edge 35 of the flange part 22 and the inner cylindrical surface 36 of the shell 25. The annular edge 35 of the flange part 22 is constructed of a diameter such that the flange part will have only working clearance within the bearing surface 36. This cooperation between the flange part and the shell 25 results in these parts, as well as the shafts 17 and 18, being diametrically confined and thus maintained in a centered or substantially coaxial relation.

The second of the confining bearings is formed by the side faces 37 and 38 of the flange part cooperating, respectively, with bearing members, preferably rings, 37' and 38' which are disposed in the intermediate ring member 19 adjacent the shell 25 thereof. This second confining bearing permits relative rotation between the ring member 19 and the flange part 22 but prevents angular deflection of the flange part relative to the ring member which would result in an undesirable wobbling or gyratory movement of the joint parts during rotation. It will be seen from this bearing arrangement that the only stress to which the rubber is subjected is a shearing stress.

In Figs. 3 and 4 of the drawings I have shown my invention embodied in another flexible joint which, in construction and principle of operation, is generally similar to the flexible joint just described. In the joint of Fig. 4, however, the flange or disk part 40 which extends into the annular recess 41 of the intermediate ring member 42 for cooperation with the rubber rings or segments 43 and 44, is in the form of a separate part, and a joint member 45, preferably in the form of a yoke of a universal joint, is connected to this flange part by means of bolts 46. The annular recess 41 of the intermediate ring member is formed between end flanges 47 and 48 which are retained in the outer tubular shell 49 by a shrink fit and by welds 50. The end flange 47 may be provided with inwardly extending lugs 51 which are connected to a flanged hub 52 by means of bolts 53, so that the intermediate ring member 42 will be connected to and carried by the shaft 54 upon which the hub 52 is keyed.

In the annular recess of the ring member 42, outwardly of the rubber rings 43 and 44, I provide a bearing groove 55 into which a bearing part 56, carried by the outer edge of the flange 40, operates. The bearing groove 55 may be formed in various ways, and in the arrangement of Fig. 4 is provided between a pair of metal rings 57, which are disposed in the recess adjacent the end flanges 47 and 48. The bearing part 56 is preferably in the form of a metal ring or a series of segments secured to the outer periphery of the flange part 40 and constructed of a size and shape to slidably operate in the groove formed between the rings 57. This bearing part may be formed from a body of suitable bearing material, such as brass or other relatively soft metal cast or otherwise secured upon the periphery of the flange part. When the bearing metal is cast upon the flange part, it is usually desirable to provide the periphery of the latter with irregularities such as the grooves 58 shown in Fig. 4, to increase the strength of the connection between the flange part and the cast metal.

In the joint arrangement just described it will be seen that the rubber rings 43 and 44, which are connected to the flanges either by friction or bonding, provide the only torque transmitting connection between the joint members, and during the transmission of torque objectionable vibrations or shocks will be cushioned and absorbed by the rubber. The flexing of the rubber will permit a limited relative rotary movement between the flange part 40 and the ring member 42, and this relative movement will be confined to a given path by the cooperating groove and bearing parts 55 and 56 so that a wobbling or gyratory movement of the joint will be prevented. The confining bearing also prevents diametrical relative movement between the flange part and the intermediate ring member.

In Fig. 5 of the drawings I have shown a flexible joint which is very much like the flexible joint shown in Fig. 4, except that the flange part 60 is an integral part of the joint member 61, and the joint member 62 which is in the form of a yoke is connected directly to the end flange 63 of the intermediate ring member 64 by means of bolts 65.

The flexible joint of Fig. 6 is also very much like the flexible joint of Fig. 4, above described, and differs from the latter only in that the end flange 66 of the intermediate ring member 67 is an integral part of the joint member 68.

The flexible joint illustrated in Fig. 7 is also similar to the flexible joint of Fig. 4, differing from the latter principally in the arrangement of the parts constituting the confining bearing. In this flexible joint of Fig. 7 the tubular shell 70 of the intermediate ring member 71 is carried directly upon the flange 72 of the joint member 73, so that the flange of the joint member forms an end flange of the intermediate ring member. A flange 74 is secured in the tubular shell in spaced relation to the flange 72 to provide the annular recess 75 which contains the rubber rings 76 and into which the flange part 77 extends for cooperation with the rubber rings. The shell 70 of the ring member is constructed with a shoulder 78 thereon, which forms one edge of the bearing groove 79 into which the outer edge of the flange part 77 extends. The other side wall of the bearing groove is formed by a ring 80 which is disposed in the tubular shell 73 just inwardly of the end flange 74. Segments 81, of suitable bearing material, may be secured to the outer periphery of the flange part 77 by means of screws 82, and slidably operate in the bearing groove. In addition to the screws 82 the segments of bearing material may be connected to the periphery of the flange part 77 by providing the flange with recesses into which tongues 83 of the segments extend, as shown in Fig. 8.

In Figs. 9 to 12 inclusive I have shown my invention embodied in a flexible joint, of which one joint member comprises a universal joint structure. In this flexible joint an intermediate ring member 85 is secured to the flange 86 of a joint member 87 by means of a series of bolts 88. The joint member 87 may have a hub portion 89, by means of which it is mounted upon and secured to a power shaft 90. The intermediate ring member 85 is of a construction similar to that already described in connection with Fig. 4 of the drawings, and includes an outer tubular shell 91 and end flanges 92 and 93 which are secured in the shell in spaced relation to provide the annular recess 94 into which the flange or disk part 95 extends. Rings or segments of rubber 96 are provided in the recess on opposite sides of the disk part 95, and are connected to the disk part and to the end flanges 92 and 93 either by bonding or by frictional engagement, so that the rubber rings provide a flexible torque transmitting connection between the ring member and the disk part 95.

The outer edge of the disk part 95 is provided with an annular bearing part 97, which may be formed of suitable bearing material, and which slidably operates in a groove 98 provided between metal rings 99. These rings are retained in the shell 91 just inwardly of the end flanges 92 and 93. The cooperating groove and bearing parts 97 and 98 confine the relative rotary movement, which is permitted between the disk part 95 and the intermediate ring member by the flexing of the rubber, to a given path, as explained above, and also diametrically confine the disk part 95 in the intermediate ring member 85.

As already mentioned, one of the joint members of this flexible joint is a universal joint structure, and this universal joint may be of different forms of construction. In Fig. 9 I have shown a universal joint 100 of the cross type as comprising the joint member which is connected to the disk part 95. The cross 101 of this universal joint structure is disposed in a correspondingly shaped opening 102 of the disk part, and one pair of trunnions 103 of the cross are connected to the disk part by a suitable yoke 104. As shown in the drawings, particularly Fig. 11, the yoke 104 is relatively flat and is disposed on the same side of the disk part as the joint member 87. The other pair of trunnions 105 of the cross extend into the opposed bearings of a second yoke 106 to which a power shaft 107 may be connected.

It will be noted, with respect to the construction and mounting of the universal joint 100, that the trunnions 103 of the cross are disposed with their axes lying substantially in the central plane of the disk part 95. The arrangement of the axes of one pair of trunnions in this location, as well as the provision of the bearing formed by the cooperating segments and groove 97 and 98, retain the joint members in centered relation so that a wobbling or gyratory movement of the intermediate ring member 85 will be prevented as the joint rotates.

In the arrangement just described it will be seen that the center of the universal joint structure is always in the central plane of the flexible joint so that there will be little or no tendency toward angular deflection of the disk part relative to the intermediate ring member. This arrangement also locates the rubber outwardly of the universal joint and the confining bearings outwardly of the rubber, which provides a very compact and efficient construction.

If desired, the flexible joint of Fig. 9 may be provided with means for preventing the lubricant, which is supplied to the trunnions of the cross, from coming in contact with the rubber rings 96. Such preventing means may be in the form of a sheet metal guard 108 of suitable shape. This guard may be secured in place by having its outer edge clamped between the flange 86 and the end flange 92 of the ring member. The guard is provided centrally thereof with an opening of suitable size, through which a lubricant overflow fitting 109 of the cross extends. When lubricant is introduced into the reservoir 110 of the cross under pressure, any excess lubricant which is forced out through the fitting 109 will be deflected away from the rubber ring 96 by the guard 108. The lubricant thus deflected by the guard may drain out of the flexible joint or be thrown therefrom by centrifugal force through a suitable opening 111. By the means just described, or the equivalent thereof, it will be seen that the destructive action of lubricant on the rubber rings 96 will thus be prevented.

From the foregoing description and the accompanying drawings it should now be readily understood that I have provided an improved flexible joint wherein objectionable vibrations and shocks are cushioned and absorbed by rubber incorporated in the joint and the limited relative movement permitted between the joint members by the rubber, is confined to a given path so that a wobbling or gyratory movement will be prevented. By use of the flexible joint which I have devised it will be seen that power transmitting shafts or other members may be connected to transmit a relatively smooth and even flow of power.

Having thus described my invention what I claim is:

1. In a rotary shaft joint, the combination of a pair of joint members one having an annular part provided with a recess at the inside thereof and the other having a flange extending outwardly into said recess, and a body of rubber in said recess having connection with said annular part and said flange for a transfer of torque therebetween with limited relative movement, said annular part also having a groove therein in which a portion of said flange operates to confine said relative movement to a given path.

2. In a rotary shaft, the combination of a pair of substantially axially aligned joint members one having an annular part provided with a recess at the inside thereof and a groove communicating with the recess and the other member having a flange extending substantially radially outwardly into said recess, bodies of rubber in said recess on opposite sides of said flange and through which torque is transmitted from one joint member to the other with limited relative rotary movement, and a bearing part on said flange operable in said groove for confining said relative movement to a plane disposed substantially normal to the axis of the joint members.

3. In a rotary shaft joint, the combination of a ring member having an annular recess at the inside thereof and a groove at the bottom of the recess, a flange extending into said recess and having a bearing part slidable in said groove, drive members connected respectively with said ring member and said flange, and bodies of rubber under compression between, and thereby frictionally connected with, said flange and walls of said recess.

4. In combination, a ring member having an annular recess therein and a groove at the bottom of said recess, a drive member connected with said ring member, a disk extending into said recess, a universal joint structure connected with said disk and having trunnions disposed with their axes lying substantially in the plane of said disk, rubber in said recess on opposite sides of the disk and connecting the latter with said ring member for the transmission of torque with limited relative movement therebetween, and a bearing part on said disk operable in said groove.

5. In combination a ring member having an annular recess therein and a groove at the bottom of said recess, a drive member connected with said ring member, a disk extending into said recess, said disk having an opening therein, a universal joint structure connected with said disk and having a cross disposed in said opening with the axes of the trunnions of the cross lying substantially in the plane of the disk, rubber in said recess on opposite sides of said disk and connecting the same with said ring member for the transmission of torque with limited relative movement therebetween, and a bearing part on said disk operable in said groove.

6. In a joint of the character described the combination of a joint member having a ring part connected therewith, a flange part diametrically confined in said ring part, a universal joint connected with the flange part with its center lying substantially in the plane of the flange part, and rubber disposed outwardly of the universal joint on opposite sides of said flange part and flexibly connecting the flange and ring parts.

7. In a joint of the character described the combination of a joint member having a ring part connected therewith, a flange part diametrically confined in said ring part, a universal joint connected with the flange part with its center lying substantially in the plane of the flange part, rubber disposed outwardly of the universal joint on opposite sides of the flange part and flexibly connecting the flange and ring parts, and bearing means substantially in the plane of the flange part and outwardly of the rubber for confining to a given path the limited movement permitted between the flange and ring parts by the flexing of the rubber.

8. In a rotary shaft joint the combination of a pair of substantially coaxially extending shaft members, joint members connected with the respective shaft members one having axially spaced walls defining an inwardly opening annular recess and the other having a flange extending outwardly into said recess, bodies of rubber in said recess between said flange and walls and connected therewith whereby torque may be transmitted from one joint member to the other by subjecting the rubber to shear, said flange having the outer edge portion thereof projecting radially outwardly beyond the bodies of rubber, and means on said one joint member having bearing cooperation with said projecting portion of the flange for confining relative rotary movement of the joint members to a transverse plane extending substantially normal to the axis of rotation.

9. In a rotary shaft joint the combination of a pair of substantially coaxially disposed joint members one having axially spaced walls defining an inwardly opening annular recess and the other having a flange extending outwardly into said recess, bodies of rubber in said recess between said flange and walls and connected therewith whereby torque may be transmitted from one joint member to the other by subjecting the rubber to shear, and cooperating bearing elements for confining relative rotary movement of the joint members to a given path, said elements comprising a groove on one joint member and means on the other joint member operable in said groove.

JOHN W. B. PEARCE.